(12) United States Patent
Bullinger et al.

(10) Patent No.: US 6,267,194 B1
(45) Date of Patent: Jul. 31, 2001

(54) BRAKE CONTROL SYSTEM FOR A MOTOR VEHICLE

(75) Inventors: Wilfried Bullinger, Korntal-Münchingen; Walter Eberle, Hochdorf, both of (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/466,049

(22) Filed: Dec. 17, 1999

(30) Foreign Application Priority Data

Dec. 17, 1998 (DE) .............................................. 198 58 292

(51) Int. Cl.$^7$ ....................................................... B60T 7/12
(52) U.S. Cl. ............................................................ 180/275
(58) Field of Search ............................................... 180/275

(56) References Cited

U.S. PATENT DOCUMENTS

| | | | | |
|---|---|---|---|---|
| 4,934,477 | * | 6/1990 | Dai .......................................... | 180/275 |
| 5,040,633 | * | 8/1991 | Donag ..................................... | 180/275 |
| 5,230,543 | * | 7/1993 | Douglas et al. ....................... | 180/275 |
| 5,469,138 | * | 11/1995 | Tsai ......................................... | 180/275 |
| 5,746,284 | * | 5/1998 | Johnson ................................. | 180/275 |

FOREIGN PATENT DOCUMENTS

| | | |
|---|---|---|
| 40 28 290 C1 | 9/1990 | (DE) . |
| 43 35 979 A1 | 10/1993 | (DE) . |
| 195 45 010 A1 | 12/1995 | (DE) . |

* cited by examiner

Primary Examiner—Kenneth R. Rice
(74) Attorney, Agent, or Firm—Mark P. Calcaterra

(57) ABSTRACT

In a brake control system for mitigating the consequences of an accident in the case of a rear-on collision of a motor vehicle, it is provided that a comparison signal assigned to the positive longitudinal acceleration of the vehicle is determined, that the comparison signal is compared with a threshold value and that, in the event that the comparison signal exceeds the threshold value, a braking signal triggering the vehicle brake is generated.

41 Claims, 1 Drawing Sheet

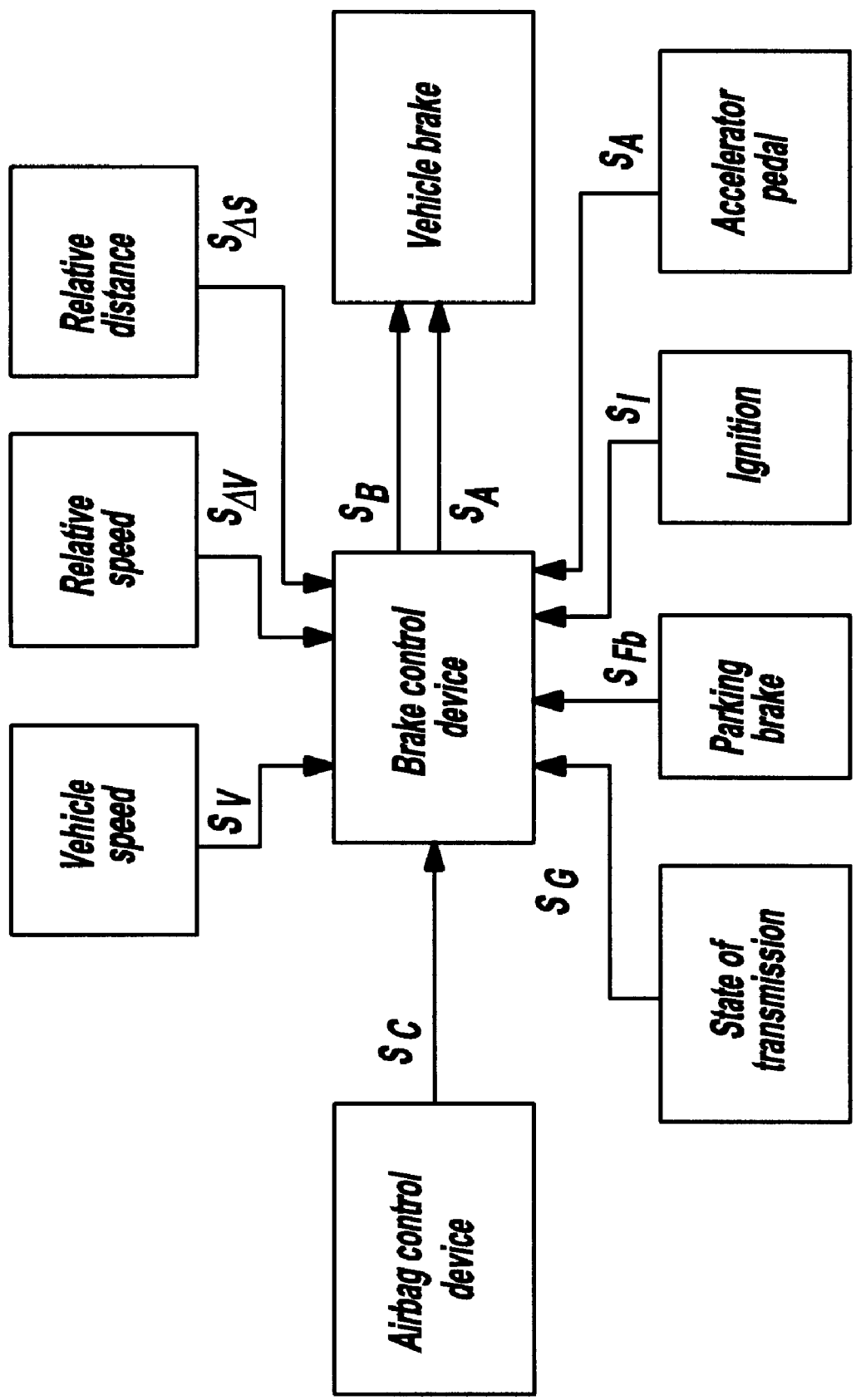

BRAKE CONTROL SYSTEM FOR A MOTOR VEHICLE

CROSS REFERENCE TO RELATED APPLICATION

Priority is claimed under 35 U.S.C §119 with respect to German Patent Application No. 198 58 292.7-21 filed on Dec. 17, 1998.

BACKGROUND OF THE INVENTION

The invention concerns a brake control system for a motor vehicle.

The document DE 40 28 290 C1 discloses a method of automatically shortening the braking distance in critical driving situations in order to compensate for certain reactions by the driver, in particular inadequate brake pedal pressure. A potentially hazardous situation is detected from the actuating speed of the brake pedal; if the brake-pedal actuating speed lies above a limit value, a hazardous situation is assumed and an automatic braking operation is triggered. In the automatic braking operation, an increased braking pressure, which is greater than the braking pressure resulting from the brake pedal position, is built up, so that a braking force exceeding that determined by the driver is produced. With this method or this device, which is also known by the term Braking Assistant, the braking distance can be shortened in emergency situations.

The Braking Assistant can indeed detect a potential emergency situation from the behavior of the driver and intensify the braking force, whereby accident situations can be prevented. However, owing to its design, the Braking Assistant is only capable of compensating for behavior of the driver which departs from optimum behavior, but not of overcoming the consequences of accident situations attributable to outside influences. In particular in the case of a rear-on collision of a vehicle, it may be expected from the momentum of the vehicle causing the collision that the vehicle hit will be propelled straight ahead or ahead at an angle. This gives rise to the risk of the forward thrust partly or completely compensating for a braking operation in the vehicle hit which began before the collision, so that the vehicle hit runs into an obstacle in front of it or in the region laterally in front of it, or comes off the carriageway. In addition to the forward thrust of the vehicle hit, it may also be expected that the already initiated braking operation will be interrupted by the braking foot slipping off or being thrown back, so that after the collision the vehicle hit is no longer subjected to any further braking action.

The invention is based on the problem of mitigating or preventing the consequences of accidents in the case of a rear-on collision.

SUMMARY OF THE INVENTION

In accordance with the novel brake system of the present invention, in the case of a rear-on collision a braking operation is triggered in the vehicle hit at the rear, with either braking being initiated or already initiated braking being continued and possibly intensified, depending on the situation. These measures allow the distance covered by the vehicle before it comes to a standstill to be shortened, which contributes to the avoidance of pile-ups and a potential reduction in the severity of the accident. The vehicle hit is in any case braked independently of the driver's reaction.

The braking signal initiating or continuing the braking operation is triggered if the comparison signal exceeds a given or calculated threshold value. Either the longitudinal acceleration of the vehicle or a variable correlated with the longitudinal acceleration of the vehicle or derived from the longitudinal acceleration of the vehicle, which can be obtained in particular by filtering, by integration or in some other way from the longitudinal acceleration of the vehicle, can be used in this case as the comparison signal.

The comparison signal can be obtained in a simple way from the acceleration sensors of an airbag system. Built into these systems are sensors for measuring the longitudinal and lateral acceleration of the vehicle; if the measuring signals exceed limit values for the acceleration, the airbag is triggered. The measuring signals of the sensors of the airbag system can be used as comparison signals for the automatic triggering of the braking operation. The level of the comparison signals advantageously serves here as a measure of the value of the braking signal to be generated, which determines the braking force. The higher the comparison signal, or the more the comparison signal exceeds the threshold value, the more intense the braking force to be generated, it being possible for the dependence of the braking signal on the comparison signal to be stored in characteristic maps or in functions of a control device and to be influenced if appropriate by further parameters and state variables.

Alternatively or in addition to the measured acceleration values supplied by the sensors of the airbag system, the comparison signals may also be supplied by additional acceleration sensors, which are expediently arranged at the rear of the vehicle.

According to a preferred configuration, in certain situations a switch-off signal is generated, by means of which the braking system can be deactivated. The switch-off signal allows additional functions, states or situations of the vehicle to be checked and used as a basis for the decision as to whether automatic braking is to be carried out. The system is deactivated, and the automatic braking operation consequently suppressed, in the event that the switch-off signal assumes or does not assume a given value or lies inside or outside a given bandwidth. The switch-off signal represents situations in which, for reasons of expediency, a triggering of the automatic braking is not desired. The switch-off signal assumes here the function of an on/off switch, which according to its position essentially allows or else generally suppresses or discontinues an automatic braking operation.

In addition to the longitudinal acceleration of the vehicle, checked by means of the comparison signal, the switch-off signal can be used to take into consideration the state of the transmission of the motor vehicle, the operating state and the actuation of the parking brake, the vehicle speed, the direction of movement and/or the actuation of the accelerator pedal as well as further functions, if appropriate. The deactivation may situationally take place here before the activation of the present braking system or else after activation of the system has taken place.

The triggering of the automatic braking operation is expediently suppressed when reverse gear is engaged and in particular during reverse travel at a vehicle speed below a limiting speed, in order to permit driving manoeuvres such as reversing into a parking space and driving over a kerbstone without automatic brake triggering in the event of minor collisions with obstacles.

In order to permit further driving of the vehicle after activation of the present braking system has taken place, the braking force automatically produced by the system must be decreased again. The switch-off signal is in this case generated in dependence on the operating state of the parking brake, the vehicle speed, the actuation of the accelerator pedal etc. For instance, in particular after automatic braking, it is checked whether the parking brake has been actuated and, if this is the case, the system has been deactivated by means of the switch-off signal. The system may also be deactivated if the vehicle has come to a standstill or the accelerator pedal has been actuated again after a predetermined dead time has elapsed.

It may on the other hand be expedient, however, to deactivate the system after triggering only if both the ignition has been switched off and the parking brake has been actuated, in order to ensure that after a collision accident a vehicle on a slope is not inadvertently set in motion by discontinuing the braking force.

The relative speed and the distance from the vehicle travelling in front and the vehicle travelling behind are preferably measured and taken into consideration in the determination of the braking force. The braking force expediently increases with an increasing differential speed of the vehicle travelling behind, in order to be able to compensate for the thrust in the event of a rear-on collision. With a decreasing distance both with respect to the vehicle travelling in front and with respect to the vehicle travelling behind, the braking force likewise advantageously increases.

The distance and the relative speed may be taken into consideration in addition to the information on the longitudinal acceleration of the vehicle in the determination of the value of the braking signal. Instead of the influence on the value of the braking signal, it may also be advantageous, however, for a prospectively required braking force to be calculated even before a calculated rear-on collision and for the correspondingly required braking pressure to have already been built up. As a result, the response time of the safety system can be reduced.

BRIEF DESCRIPTION OF THE DRAWINGS

Further advantages and expedient embodiments can be taken from the further claims, the description and the drawing, in which a block diagram is represented for the automatic activation of the vehicle brake in the case of a rear-on collision.

DETAILED DESCRIPTION OF THE PREFERRED EMBODIMENT

The present brake control system comprises a brake control device for the generation of braking signals $S_B$, which are generated for the initiation of an automatic braking operation in the case of a collision accident of the vehicle hit at the rear. The braking signals $S_B$ are supplied via a signalling line to the vehicle brake or to the hydraulic unit controlling the braking force of the vehicle brake. The brake control device is connected via further signalling lines to an upstream airbag control device, or communicates with further open-loop and closed-loop control units or with sensors. The further open-loop and closed-loop control units or sensors supply information in signal form on the vehicle speed $S_v$, the relative speed in relation to a vehicle travelling in front and/or behind $S_{Av}$, the relative distance from a vehicle travelling in front and/or behind $S_{As}$, the state of the transmission $S_G$, the operating state of the parking brake $S_{Fb}$ and of the ignition $S_I$, the position of the accelerator pedal $S_a$ and, if appropriate, on further parameters, state variables or characteristic variables for describing driving situations.

The airbag control device communicates via a control line connection or via a CAN line with the brake control device and supplies the comparison signal $S_c$ to the brake control device. The comparison signal $S_c$ corresponds to the operating signal of the positive longitudinal acceleration of the vehicle—seen in the longitudinal direction of the vehicle—which is detected in the airbag system, is determined by sensors and is also used for triggering the airbag. In the brake control device, the comparison signal $S_c$ is compared with a threshold value; if the value of the comparison signal exceeds the threshold value, the braking signal $S_B$ triggering the vehicle brake is generated in the brake control device and passed to the vehicle brake, in which a braking operation is automatically initiated or continued.

The threshold value which is used for comparison with the comparison signal $S_c$ may either be given as a fixed, constant value and be stored in a memory unit of the brake control device or be stored as a possibly multidimensional characteristic map or as a function in dependence on changing influencing variables, in particular in dependence on the abovementioned influencing variables communicating with the brake control device.

The value of the braking signal $S_B$ may likewise be made dependent on different factors, the value of the braking signal being variable between a value corresponding to partial braking and a value corresponding to full braking. Considered in particular as an influencing variable is the relative speed $S_{Av}$ of a vehicle travelling behind, the braking signal $S_B$ being all the greater the more the speed of the vehicle travelling behind exceeds the vehicle's own speed. In a similar way, the relative speed in relation to the vehicle travelling in front may be taken into consideration, by increasing the value of the braking signal $S_B$, determining the braking force, to the extent to which the vehicle's own speed exceeds the speed of the vehicle travelling in front. In addition, the relative distance $S_{As}$ may also be included in the determination of the threshold value, the braking signal $S_B$ advantageously being set approximately inversely proportional to the relative distance from the vehicle travelling behind and/or in front.

Generated in the brake control device in addition to the braking signal $S_B$ is a switch-off signal $S_A$, which has the task of deactivating the brake control system in certain driving situations for reasons of expediency, so that the execution of the automatic braking operation is either prevented or an already triggered automatic braking operation is discontinued. In the first case, which is intended in particular to permit reversing, the state of the transmission is checked and it is determined whether reverse gear has been engaged. As long as the vehicle speed of the reversing vehicle lies below a minimum speed, the switch-off signal $S_A$ is set to a value deactivating the system, so that automatic braking cannot be triggered. Irrespective of the travelling direction, a speed limit value, in particular an absolute speed at a level of 8 km/h, may be given, below which triggering of the automatic braking operation is prevented.

To be able to move the vehicle again after an automatic braking operation has already been triggered, the braking action must be discontinued, it being possible for the discontinuance of the braking action to be linked with conditions. In particular for preventing unintended rolling away on a slope, the operating state of the parking brake and the vehicle speed are determined; if the vehicle speed is zero and if the parking brake has been actuated, the vehicle is at a standstill and has been arrested, whereupon the automatically triggered vehicle brake can be released again by means of the switch-off signal $S_A$. As a further or alternative criterion, the actuation of the accelerator pedal may be used, the vehicle brake being released if the driver actuates the accelerator pedal.

As an additional feature, it may be taken into consideration that releasing of the vehicle brake is not possible when the ignition has been switched off and the parking brake has not been actuated.

In an alternative configuration, the switch-off signal $S_A$ of the vehicle brake is not supplied as a separately formed signal, but instead the generation of a braking signal $S_B$ actuating the vehicle brake is already prevented in the brake control device.

It may be expedient to perform the detection of the longitudinal acceleration of the vehicle independently of the airbag control device. In this case, the longitudinal acceleration of the vehicle is determined by means of sensors formed separately from the airbag control device, in particular by means of sensors arranged in the rear of the vehicle, and is supplied to the brake control device as a comparison value $S_c$. Instead of acceleration sensors, in principle a radar or infrared sensor system or image-processing systems may also be used.

In addition, it is also possible to use as a comparison signal a signal correlating with the longitudinal acceleration of the vehicle, for example a signal which is generated by manipulation of the signal corresponding to the longitudinal acceleration of the vehicle and is subsequently supplied to the brake control device. Furthermore, it is possible for the brake control device to be supplied with the longitudinal acceleration of the vehicle as a comparison signal $S_c$, but for this to be manipulated in the brake control device, in particular filtered or subjected to corrective algorithms or integrated in order to determine the severity of the accident. Pressure values which originate from pressure sensors at the rear of the vehicle may also be used as a comparison signal which correlates with the longitudinal acceleration of the vehicle. If appropriate, however, the depth of penetration and/or the rate of penetration of the colliding vehicle, measured by displacement sensors, may also be taken into consideration.

The change in speed before and after the impact of the vehicle hit may also be taken into consideration as a measure of the severity of the accident.

The foregoing discussion discloses and describes merely exemplary embodiments of the present invention. One skilled in the art will readily recognize from such discussion, and from the accompanying drawings and claims, that various changes and modifications can be made therein without departing from the spirit and scope of the invention as defined in the following claims.

What is claimed is:

1. Safety system for mitigating the consequence of an accident in the case of a rear-on collision of a first vehicle by a second vehicle following the first vehicle, characterized
   in that a comparison signal ($S_C$) assigned to the positive longitudinal acceleration of the first vehicle in response to the accident is determined,
   in that the comparison signal ($S_C$) is compared with a threshold value,
   in that, in the event that the comparison signal ($S_C$) exceeds the threshold value, a braking signal ($S_B$) triggering a vehicle brake is generated.

2. Safety system according to claim 1, characterized in that a distance from the second vehicle is measured and, in the case of automatic braking, the braking signal ($S_B$) is set to a value which increases as the distance from the second vehicle decreases.

3. Safety system according to claim 1, characterized in that the distance from a third vehicle travelling in front of the first vehicle is measured and, in the case of automatic braking, the braking signal ($S_B$) is set to a value which behaves reciprocally with respect to the distance from the first vehicle to the third vehicle travelling in front.

4. Safety system according to claim 1, characterized in that the distance from and relative speed in relation to a third vehicle travelling in front of the first vehicle are measured and, in the case of automatic braking, the braking signal ($S_B$) is set to a value which prevents driving into a vehicle traveling in front of an obstacle.

5. Safety system according to claim 1, characterized in that the comparison signal ($S_C$) is obtained from sensors of an airbag system of the first vehicle.

6. Safety system according to claim 1, characterized in that the comparison signal ($S_C$) is obtained from acceleration sensors at a rear of the first vehicle.

7. Safety system according to claim 1, characterized in that the comparison signal ($S_C$) is obtained from acceleration sensors at a rear of the first vehicle.

8. Safety system according to claim 1, characterized in that the comparison signal ($S_C$) is the positive longitudinal acceleration of the first vehicle.

9. Safety system according to claim 1, characterized in that the value of the braking signal ($S_B$) determining the braking force is fixed in dependence on the value of the comparison signal ($S_C$).

10. Safety system according to claim 1, characterized in that the comparison signal ($S_C$) is filtered.

11. Safety system according to claim 1, characterized in that a switch-off signal ($S_A$) is generated for deactivating a safety system of the first vehicle in the event that a function, a state or a situation of the first vehicle lies inside or outside a certain value or a certain bandwidth.

12. Safety system according to claim 10 or 11, characterized in that the state of a transmission of the first vehicle is checked and the switch-off signal ($S_A$) is set to a value deactivating the safety system if reverse gear has been engaged.

13. Safety system according to claim 10 or 11, characterized in that the direction of movement is determined and, in the case of a reversing movement of the vehicle, the switch-off signal ($S_A$) is set to a value deactivating the safety system.

14. Safety system according to claim 11, characterized in that the switch-off signal ($S_A$) is set to a value deactivating the safety system if a speed of the first speed lies within a given bandwidth and is below a minimum speed.

15. Safety system according to claim 11, characterized in that the switch-off signal ($S_A$) takes place following the triggering of the safety system.

16. Safety system according to claim 15, characterized in that the operating state of a parking brake of the first vehicle is determined and the switch-off signal ($S_A$) is set to a value deactivating the safety system if the parking break has been actuated.

17. Safety system according to claim 15, characterized in that the speed of the first vehicle speed is determined and the switch-off signal ($S_A$) is set to a value deactivating the safety system if the vehicle speed is equal to zero.

18. Safety system according to claim 15, characterized in that the speed of the first vehicle speed is determined and the switch-off signal ($S_A$) is set to a value deactivating the safety system if the vehicle speed is equal to zero.

19. Safety system according to claim 15, characterized in that the switch-off signal ($S_A$) is not set to a value deactivating the safety system if the ignition has been switched off and the parking brake has not been actuated.

20. Safety system according to claim 15, characterized in that the switch-off signal ($S_A$) is not set to a value deactivating the safety system if the ignition has been switched off and, when an automatic transmission is used, the selector lever is not in the park position.

21. Safety system according to claim 15, characterized in that the switch-off signal ($S_A$) is not set to a value deactivating the safety system if the ignition has been switched off and, when an manual transmission is used, no gear has been engaged.

22. Safety system according to claim 1, characterized in that the speed of a following vehicle is measured and, in the case of automatic braking, the braking signal ($S_B$) is set to a value which, with increasing the speed of the following vehicle, likewise increases.

23. A method of mitigating the consequence of an accident in the case of a rear-on collision of a first vehicle by a second vehicle travelling behind the first vehicle, the method comprising the steps of:

generating a comparison signal ($S_C$) which varies according to a positive longitudinal acceleration of the first vehicle resulting from the rear-on collision;

comparing the comparison signal ($S_C$) with a threshold value; and generating a braking signal ($S_B$) to trigger a vehicle brake of the first vehicle if the comparison signal ($S_C$) exceeds the threshold value.

24. The method according to claim 23, further comprising the step of setting the braking signal ($S_B$) to a value which increases as a distance between the first and second vehicles decreases.

25. The method according to claim 23, further comprising the steps of:

measuring a distance from a third vehicle travelling in front of the first vehicle; and setting the braking signal ($S_B$) to a value which behaves reciprocally with respect to the distance between the first and third vehicles.

26. The method according to claim 23, further comprising the steps of:

measuring a distance from and relative speed in relation to a third vehicle travelling in front of the first vehicle; and setting the braking signal ($S_B$) to a value which prevents driving into a vehicle traveling in front of an obstacle.

27. The method according to claim 23, comprising the step of obtaining the comparison signal ($S_C$) from a sensors of an airbag system of the first vehicle.

28. The method according to claim 23, comprising the step of obtaining the comparison signal ($S_C$) from acceleration sensors at a rear of the first vehicle.

29. The method according to claim 23, wherein the comparison signal ($S_C$) is the positive longitudinal acceleration of the first vehicle.

30. The method according to claim 23, comprising the step of setting of the braking signal ($S_B$) for determining the braking force as a function of the comparison signal ($S_C$).

31. The method according to claim 23, further comprising the step of filtering the comparison signal ($S_C$).

32. The method according to claim 23, further comprising the step of generating a switch-off signal ($S_A$) for deactivating a safety system of the first vehicle in response to a predetermined event.

33. The method according to claim 32, further comprising the steps of:

determining the state of a transmission of the first vehicle; and setting the switch-off signal ($S_A$) to a value deactivating the safety system if a reverse gear of the transmission has been engaged.

34. The method according to claim 32, further comprising the steps of:

determining a direction of movement; and setting the switch-off signal ($S_A$) to a value deactivating the safety system if the direction of movement is reverse.

35. The method according to claim 32, further comprising the step of setting the switch-off signal ($S_A$) to a value deactivating the safety system if the vehicle speed lies within a given bandwidth and is below a minimum speed.

36. The method according to claim 32, further comprising the steps of: c determining the state of a parking brake of the first vehicle; and setting the switch-off signal ($S_A$) to a value deactivating the safety system if the parking brake has been actuated.

37. The method according to claim 32, comprising the step of:

determining a speed of the first vehicle speed; and setting the switch-off signal ($S_A$) to a value deactivating the safety system if the vehicle speed is equal to zero.

38. The method according to claim 32, comprising the steps of:

determining the state of an ignition of the first vehicle;

determining the state of a parking brake of the first vehicle; and setting the switch-off signal ($S_A$) to a value which does not deactivate the safety system if the ignition has been switched off and the parking brake has not been actuated.

39. The method according to claim 32, further comprising the step of setting the switch-off signal ($S_A$) to a value which does not deactivate the safety system if an ignition of the first vehicle has been switched off and when a park position of an automatic transmission of the first vehicle is selected.

40. The method according to claim 32, further comprising the step of setting the switch-off signal ($S_A$) to a value which does not deactivate the safety system if an ignition of the first vehicle has been switched off and no gear of a manual transmission of the first vehicle has been engaged.

41. The method according to claim 23, further comprising the steps of measuring the speed of a following vehicle; and setting the braking signal ($S_B$) is set to a value which increases with increasing of the speed of the following vehicle.

* * * * *